US010515554B1

(12) United States Patent
Shamasundar (10) Patent No.: US 10,515,554 B1
(45) Date of Patent: Dec. 24, 2019

(54) SYSTEMS AND METHODS FOR TIME-BASED VIEWING OF PREDICTED CLEARANCE REQUESTS

(71) Applicant: HONEYWELL INTERNATIONAL INC., Morris Plains, NJ (US)

(72) Inventor: Raghu Shamasundar, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/155,146

(22) Filed: Oct. 9, 2018

(51) Int. Cl.
*G08G 5/00* (2006.01)
*G01S 7/04* (2006.01)

(52) U.S. Cl.
CPC .............. *G08G 5/0008* (2013.01); *G01S 7/04* (2013.01); *G08G 5/0013* (2013.01); *G08G 5/0021* (2013.01); *G08G 5/0078* (2013.01)

(58) Field of Classification Search
CPC .. G08G 5/0008; G08G 5/0013; G08G 5/0021; G08G 5/0078; G01S 7/04
USPC ........... 340/945, 961, 971, 973, 979; 701/14
See application file for complete search history.

(56) References Cited

U.S. PATENT DOCUMENTS

| | | | | |
|---|---|---|---|---|
| 6,085,129 A | * | 7/2000 | Schardt | G01C 23/00 340/971 |
| 6,160,497 A | * | 12/2000 | Clark | G01S 7/04 340/945 |
| 6,700,482 B2 | * | 3/2004 | Ververs | G01C 23/00 340/500 |
| 7,979,199 B2 | | 7/2011 | Judd et al. | |
| 9,592,921 B2 | | 3/2017 | Dominic et al. | |
| 9,593,961 B2 | | 3/2017 | Ramaiah et al. | |
| 2005/0049762 A1 | * | 3/2005 | Dwyer | G01C 23/00 701/3 |
| 2013/0268878 A1 | * | 10/2013 | Le Roux | G09B 9/08 715/772 |
| 2014/0039734 A1 | * | 2/2014 | Ramaiah | G01W 1/02 701/14 |
| 2014/0253585 A1 | * | 9/2014 | Paul Dominic | B64D 45/00 345/629 |
| 2015/0364044 A1 | * | 12/2015 | Kashi | G08G 5/0095 701/120 |
| 2016/0035227 A1 | | 2/2016 | Kumar et al. | |
| 2017/0124734 A1 | | 5/2017 | Gowda | |
| 2018/0240347 A1 | | 8/2018 | Shamasundar et al. | |

* cited by examiner

*Primary Examiner* — Emily C Terrell
(74) *Attorney, Agent, or Firm* — Lorenz & Kopf, LLP (57) ABSTRACT

Systems and methods for time-based viewing of clearance requests are provided. The system generates a time scale of substantially a same width as a displayed lateral image and renders the time scale on a periphery of the lateral image. The system receives a recommended change to an active trajectory from one or more on-board avionics or external sources, and then time-tag processes the recommended change to predict a clearance request and its associated relevant time. The system is configured to receive a user selected future time for viewing clearance requests. Responsive to the user selected future time, the system determines that the predicted clearance request is relevant at the future time, formats the predicted clearance request as a downlink message (DM), and renders, on the time scale, the formatted predicted clearance request alongside a symbolic indicator at the future time.

20 Claims, 5 Drawing Sheets

SYSTEMS AND METHODS FOR TIME-BASED VIEWING OF PREDICTED CLEARANCE REQUESTS

TECHNICAL FIELD

The technical field generally relates to navigational aids, and more particularly relates to systems and methods for time-based viewing of clearance requests.

BACKGROUND

During the course of flight, a lot of messages are exchanged between a flight crew and a ground station or air traffic controller (ATC). Communication between ATC and an aircraft is often tactical and related to the ATC managing traffic in a given airspace. Tactical communication between the flight crew on an aircraft and ATC generally occurs over a prearranged communication medium. In an example, wireless messages may be transmitted from the ATC to an aircraft as a data uplink, and from the aircraft to the ATC as a data downlink. Examples of uplink messages from ATC stations include route clearances, lateral diversions, vertical diversions, speed changes, route modifications, etc. In the future, most of the ATC to aircraft communication may be carried out through digital media i.e., as controller pilot data link communication (CPDLC) messages. CPDLC allows the flight crew to request deviations to, or replacements of, the current active trajectory or filed flight plan (FP). The CPDLC also allows the ATC to directly request tactical changes to the current active trajectory or FP. Therefore, the CPDLC provides air/ground communications between an aircraft and an ATC station.

Currently, on an aircraft, a combination of on-board avionics and external sources validate the current active flight trajectory and recommend changes based thereon to the flight crew in the cockpit. Information regarding the validated current active flight trajectory and recommended changes may be dissipated in real-time via a defined communication protocol, such as voice messaging or datalink messages that are hosted in a CPDLC application. Generally, this information is presented to a flight crew using a multi-function display (MFD) or multi-function control display unit (MCDU), to which the crew needs access to understand and take appropriate action when needed. However, time spent watching the MFD/MCDU for real-time information is head-down time, and head-down time may decrease flight crew situation awareness.

Accordingly, technologically enhanced systems and methods capable of reducing head-down time while continuing to provide crucial, relevant clearance request information are desirable. In particular, it is desirable to provide the crew with a mechanism for time-based visualization of relevant clearance requests, i.e., predicted clearance request information for a selected future time. Technical effects of this desired system include reduced head-down time, increased pilot control of the occurrence of head-down time, and an ability for a flight crew to negotiate with ATC for a clearance request, and an overall improved pilot-machine interface. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for time-based viewing of clearance requests, comprising: a source of aircraft state data; a source of an active trajectory; a display system configured to process the aircraft state data and active trajectory data to display a continuously updated lateral image depicting the aircraft at a current location on the active trajectory; a source of a recommended change, defined as a recommended change to the active trajectory; and a control module operationally coupled to the source of aircraft state data, the source of the active trajectory, the display system, and the source of the recommended change, the control module configured to: generate a time scale of substantially a same width as the lateral image, having therein equidistant time demarcations from left to right; command the display system to display the time scale at a periphery of the image; time-tag process the recommended change to predict a clearance request; receive a user selected future time; determine that the predicted clearance request is relevant at the future time; format the predicted clearance request as a downlink message (DM); and render, on the time scale, the formatted predicted clearance request at the future time.

Also provided is s method for clearance request prediction, comprising: at a display system, receiving and processing aircraft state data and active trajectory data to display a continuously updated lateral image; at a control module operationally coupled to the display system, generating a time scale; commanding the display system to render the time scale; receiving a recommended change to the trajectory; time-tag processing the recommended change to predict a clearance request and associated time; receiving a user selected future time; determining that the predicted clearance request is relevant at the future time; formatting the predicted clearance request as a downlink message (DM); and rendering, on the time scale, the formatted predicted clearance request at the future time.

Also provided is another system for time-based viewing of clearance requests, comprising: a source of aircraft state data; a source of an active trajectory; a display system configured to process the aircraft state data and active trajectory data to display a continuously updated lateral image depicting the aircraft at a current location on the active trajectory; a source of a recommended change, defined as a recommended change to the active trajectory; and a control module operationally coupled to the source of aircraft state data, the source of the active trajectory, the display system, and the source of the recommended change, the control module configured to: generate a time scale of substantially a same width as the lateral image, having therein equidistant time demarcations from left to right; command the display system to display the time scale at a periphery of the image; time-tag process the recommended change to predict a clearance request; receive a user selected future time; display a symbolic indicator at the future time on the time scale; determine whether the predicted clearance request is relevant at the future time; format the predicted clearance request as a downlink message (DM); and render, on the time scale, the formatted predicted clearance request alongside the symbolic indicator at the future time while the predicted clearance request is relevant at the future time.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

The disclosed system and method generate and overlay a time-based predicted strategic request clearance information on a lateral view display, such as a Navigation Display (ND). The system enables the crew to select a required forward time (referred to herein as future time) for which to visualize relevant request clearance information. The system responds to the user selected future time by rendering symbology and data indicating route changes and availability of performance-based requests that are relevant in the selected future time. Some of the technical effects include a resulting advance notification to the crew, an improved human-machine interface experience, and an improved cockpit display system over available cockpit display systems not utilizing this novel system and method. In addition, this novel system and method enables advance communication between crew and Air traffic control, which increases safety and efficiency.

Exemplary embodiments provide a technical solution to this problem in the form of a control module (FIG. 1, 102) embodying novel rules and parameters. The disclosed control module receives a recommended change to an active trajectory and time-tags it to its relevant time. The time-tagged recommendation is formatted as a downlink message (DM), and its associated time for which it is relevant is managed with respect to current time and with respect to other recommended changes. Responsive to a user selection of a time frame for display, the system 102 provides time-based visualization of relevant clearance requests, for example, via a display system The figures and descriptions below provide more detail.

Figure 1:
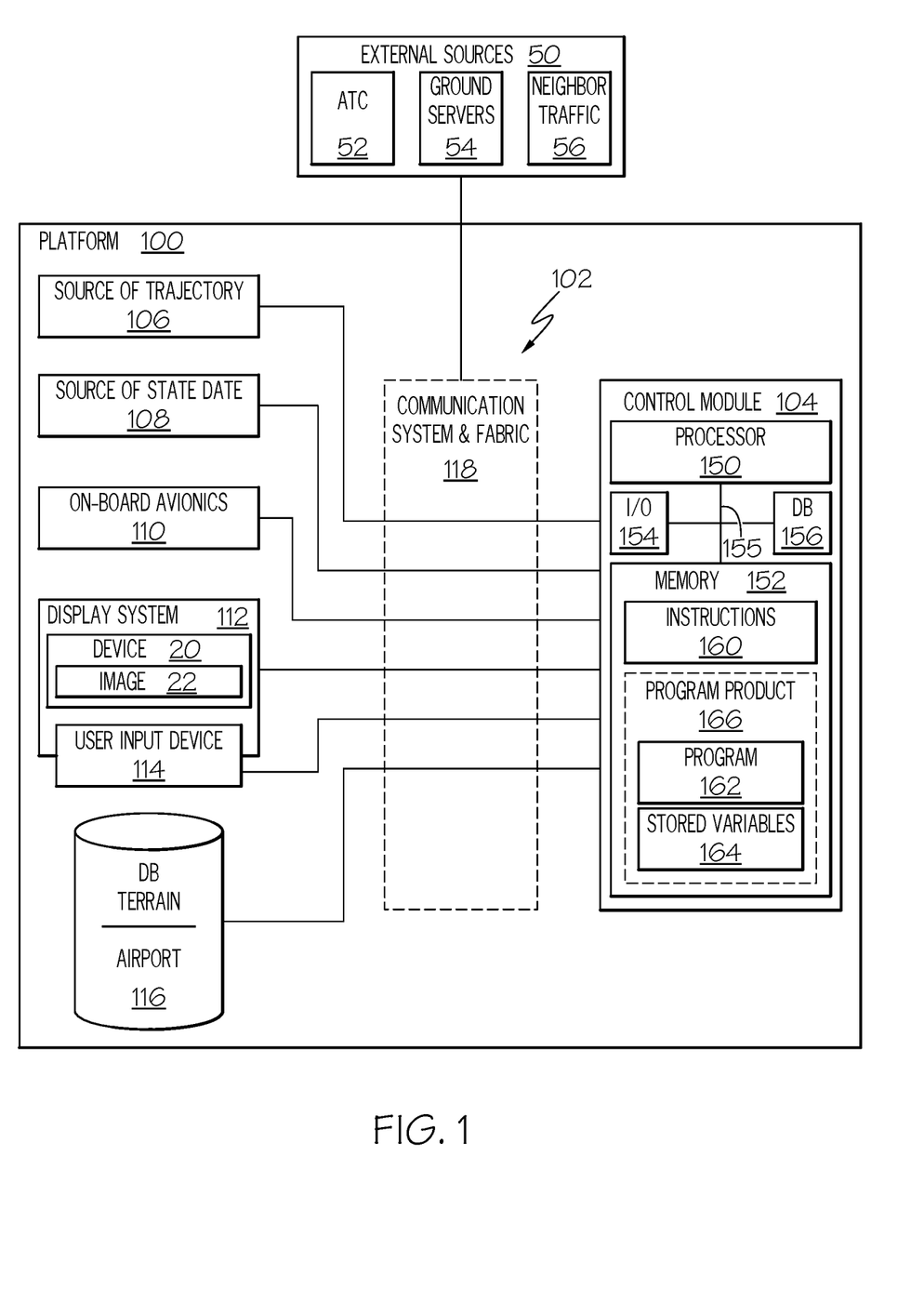
FIG. 1 is a block diagram of time-based viewing of clearance requests system, in accordance with an exemplary embodiment.

Turning now to FIG. 1, in an embodiment, the system for adaptively predicting clearance requests 102 (also referred to herein as "system" 102) is generally associated with a mobile platform 100. In various embodiments, the mobile platform 100 is an aircraft, and is referred to as aircraft 100. The system 102 embodies a control module 104. In some embodiments, the control module 104 may be integrated within a preexisting mobile platform management system, avionics system, cockpit display system (CDS), flight controls system (FCS), or aircraft flight management system (FMS). Although the control module 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, the display system 112 and user input device 114 may also be part of the EFB or PED.

The control module 104 may be operationally coupled to any combination of the following aircraft systems: a communication system and fabric 118; a source of real-time aircraft state data 108, such as a navigation system; a source of an active trajectory 106, such as a navigation database (NavDB); one or more databases 116; a source of a recommended change to the trajectory, such as the on-board avionics 110, or external sources 50; a display system 112; and a user input device 114. The control module 104 may be communicatively coupled to external sources, such as a source of notices to airmen (NOTAM), air traffic control, and a source of traffic data, such as automatic dependent surveillance broadcast (ADS-B) and traffic information service broadcast (TIS-B). In various embodiments, the control module 104 is additionally operationally coupled to one or more avionics systems 110. The functions of these aircraft systems, and their interaction, are described in more detail below.

Real-time aircraft state data may include any of: an instantaneous location (e.g., the latitude, longitude, orientation), an instantaneous heading (i.e., the direction the aircraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. In some embodiments, the real-time aircraft state data is generated by a navigation system. The navigation system may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the data referred to herein as the real-time aircraft state data may be referred to as navigation data, since it may be provided by a navigation system. The real-time aircraft state data is made available, generally by way of the communication system and fabric 118, so other components, such as the control module 104 and the display system 112, may further process and/or handle the aircraft state data.

An active trajectory may include a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). As such, an active trajectory may be part of a operational flight plan (OFP). A source of the active trajectory 106 may be a storage location or a user input device. In various embodiments, a navigation database, NavDB, is the source of the active trajectory or OFP. The NavDB is a storage location that may also maintain a database of flight plans, and/or information regarding terrain and airports and/or other potential landing locations (or destinations) for the aircraft 100.

The on-board avionics 110 generally provide, for each of a variety of aircraft 100 subsystems, sensed data and performance data. Examples of on-board avionics data include: engine thrust level, fuel level, flap configuration, braking status, temperature control system status, and the like. As may be appreciated, the on-board avionics 110 may therefore include a variety of on-board detection sensors and may be operationally coupled to the control module 104, central management computer, or FMS. The on-board avionics 110 can be a source of a request for a change to an active trajectory.

In various embodiments, a communications system and fabric 118 is configured to support instantaneous (i.e., real time or current) communications between on-board systems (i.e., the source of state data 108, the source of trajectory 106, the databases 116, and the on-board avionics 110), the control module 104, and the one or more external data source(s) 50. As a functional block, the communications system and fabric 118 represents one or more transmitters, receivers, and the supporting communications hardware and software required for components of the system 102 to communicate as described herein. In various embodiments, the communications system and fabric 118 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communications system and fabric 118 also support the herein referenced controller pilot data link communications (CPDLC), such as through an aircraft communication addressing and reporting system (ACARS) router; in various embodiments, this feature may be referred to as a communications management unit (CMU) or communications management function (CMF). In summary, the communications system and fabric 118 may allow the aircraft 100 and the control module 104 to receive information that would otherwise be unavailable to the pilot and/or co-pilot using only the onboard systems.

External sources 50 communicate with the aircraft 100 and the control module 104, generally, by way of the communication system and fabric 118. External sources 50 include: notice to airmen (NOTAM), ATC 52 (which includes CPDLC transmissions), ground servers 54, neighbor traffic data system(s) 56; and, a variety of other radio inputs, such as source(s) of radio signals used by an instrument landing system (ILS), and weather data and surface data sources, such as a source for meteorological terminal aviation weather reports (METARS), automatic terminal information service (ATIS), datalink ATIS (D-ATIS), automatic surface observing system (ASOS). The traffic data system(s) 56 include numerous systems for providing real-time neighbor/relevant traffic data and information. For example, traffic data sources 56 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective instantaneous location and heading, vertical speed, ground speed, instantaneous altitude, and aircraft identification. In various embodiments, data from one or more of the external sources 50 may be an instigator or source of a recommended change to the active trajectory.

The user input device 114 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used by a pilot to communicate with external sources, such as ATC 52, to modify or upload the program product 166, etc. In various embodiments, the display system 112 and user input device 114 are onboard the aircraft 100 and are also operationally coupled to the communication system and fabric 118. In some embodiments, the control module 104, user input device 114, and display system 112 are configured as a control display unit (CDU).

In various embodiments, the control module 104, alone, or as part of a central management computer (CMS) or a flight management system (FMS), draws upon data and information from the source of trajectory 106 and source of state data 108 to provide real-time flight guidance for aircraft 100. The real time flight guidance may be provided to a user by way of images on the display system 112, audible emissions from an audio system, or the like. For example, the control module 104 may compare an instantaneous position and heading of the aircraft 100 with the operational flight plan data for the aircraft 100 and generate display commands to render images 22 showing these features and distinguishing them from each other. The control module 104 may further provide flight guidance responsive to associating a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the navigation plan for the aircraft 100.

The control module 104 may perform display processing. As such, the control module 104 generates display commands for the display system 112 to cause the display device 20 to render thereon the image 22, comprising various graphical user interface elements, tables, icons, alerts, menus, buttons, and pictorial images, as described herein. The display system 112 is configured to continuously receive and process the display commands from the control module 104. The display system 112 includes a display device 20 for presenting an image 22. In various embodiments described herein, the display system 112 includes a synthetic vision system (SVS), and the image 22 is a SVS image. In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

The control module 104 may perform graphical processing. Responsive to display commands, renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 may be said to display various images and selectable options described herein. In practice, this may mean that the control module 104 generates display commands, and, responsive to receiving the display commands from the control module 104, the display system 112 displays, renders, or otherwise visually conveys on the display device 20, the graphical images associated with operation of the aircraft 100, and specifically, the graphical images as directed by the control module 104. In various embodiments, any combination of the control module 104, user input device 114, avionics systems 110, and communication system and fabric 118, may be coupled to the display system 112 such that the display system 112 may additionally generate or render, on the display device 20, real-time avionics systems information associated with respective aircraft 100 systems and components.

In various embodiments, the control module 104 is additionally operationally coupled to one or more databases 116. The databases 116 may provide terrain and airport feature data having therein topographical information for the airport and surrounding environment. Therefore, databases 116 may include one or more of: a runway awareness and advisory system (RAAS) database and an Aerodrome Mapping Database (AMDB). In various embodiments, the databases 116 have therein maps and geometries, including runway records with corresponding runway threshold locations. The AMDB may also include airport status data for the runways and/or taxi paths at the airport; the airport status data indicating operational status and directional information for the taxi paths (or portions thereof).

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system comprising a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external source 50 during an initialization step of a process; it may also be programmed via a user input device 114. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, convert the processor 150/memory 152 configuration into the control module 104, which is a novel "time-based viewing of clearance requests" control module that performs the functions, techniques, and processing tasks associated with the operation of the system 102. Novel program 162 and associated stored variables 164 may be stored in a functional form on computer readable media, for example, as depicted, in memory 152. While the depicted exemplary embodiment of the control module 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 and the database 116 are integrated, either within the control module 104 or external to it. Accordingly, in some embodiments, the airport features data and terrain features are pre-loaded and internal to the control module 104.

As mentioned, the novel control module 104 may perform the functions of dynamic time tag processing, display processing, and graphical processing. In executing these functions, the processor 150 specifically loads the instructions embodied in the program 162, thereby being programmed with program 162. During execution of program 162, the processor 150, the memory 152, and the database DB 156 form novel dynamic time tag processing, display processing, and graphical processing engines that perform the functions and tasks of the system 102.

Figure 2:
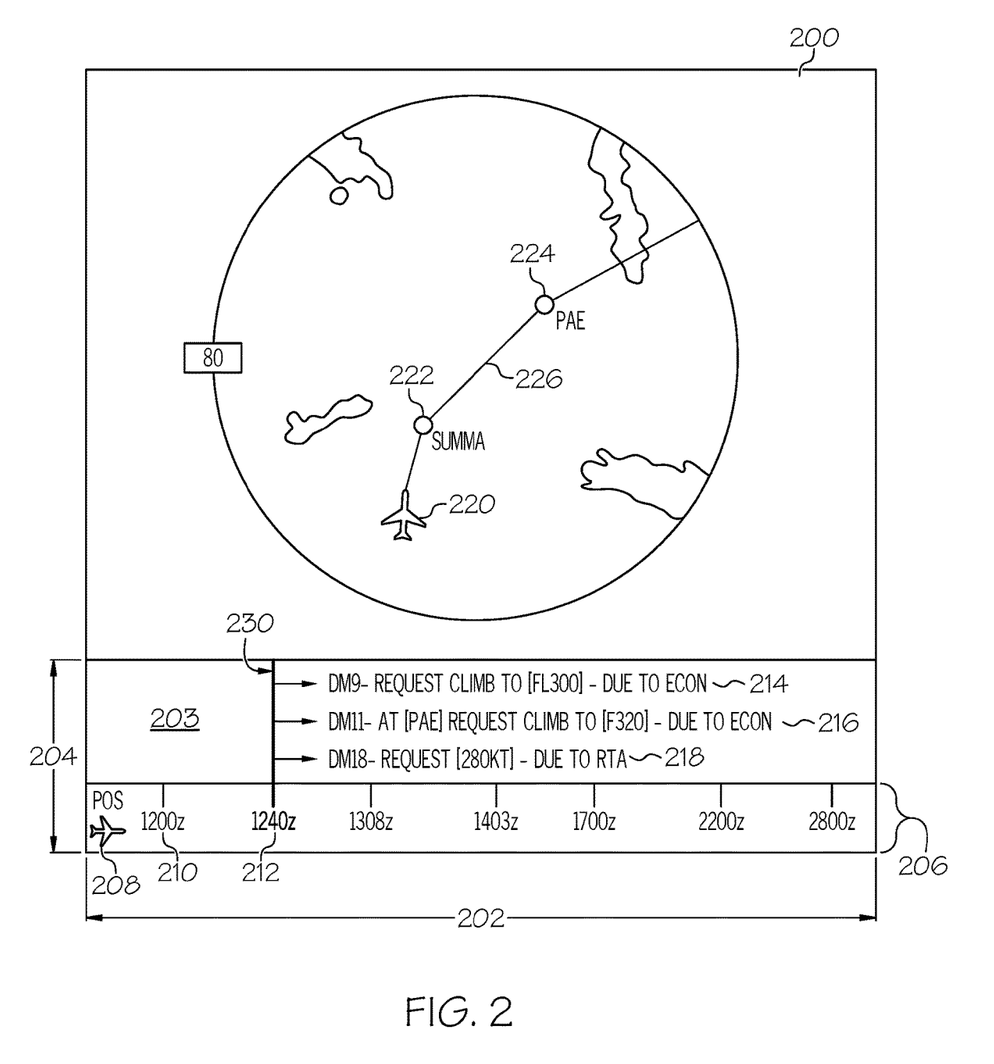
FIGS. 2-4 are illustrations depicting use cases for the time-based viewing of clearance requests system, in accordance with an exemplary embodiment.
Figure 3:
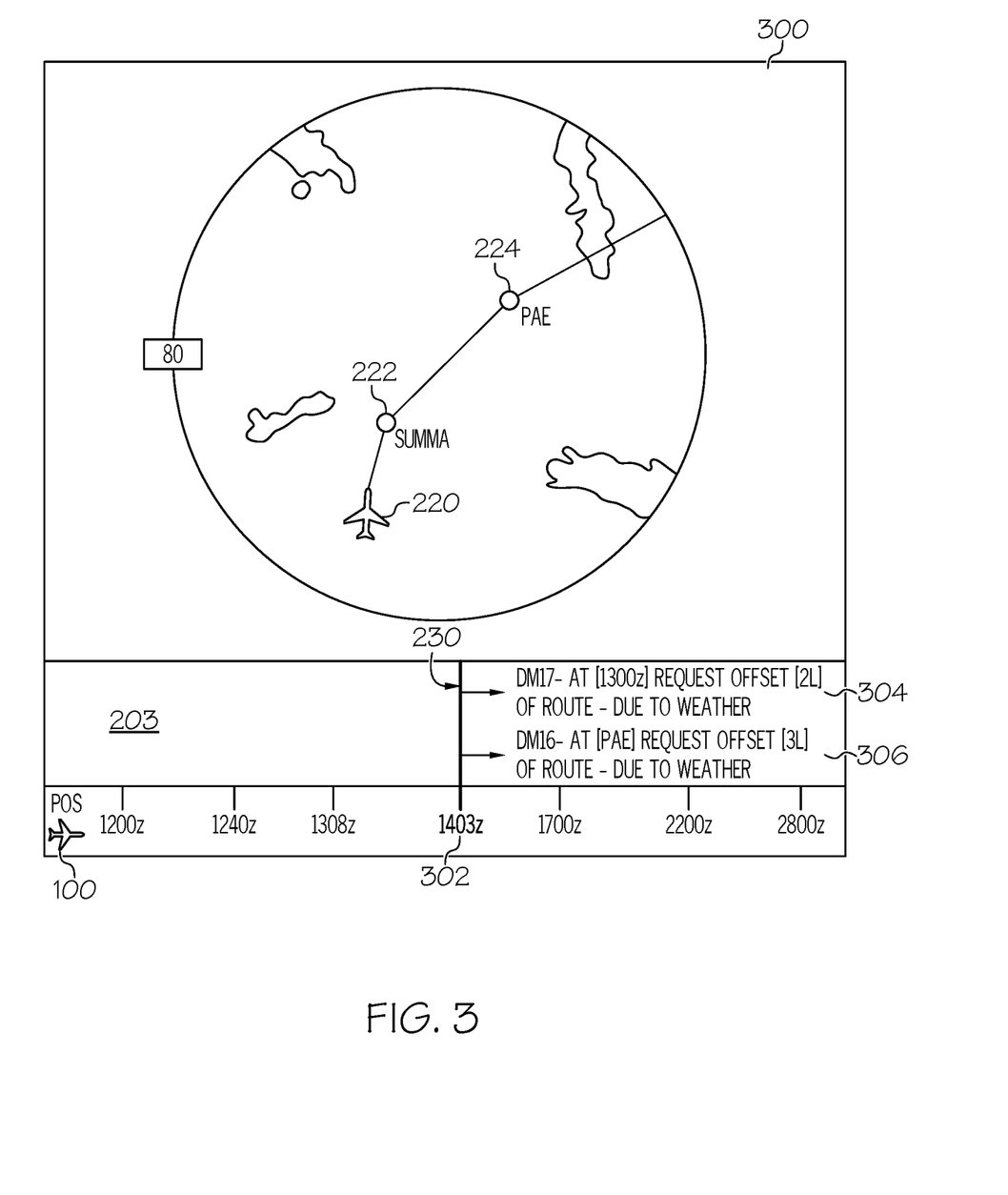
Figure 4:
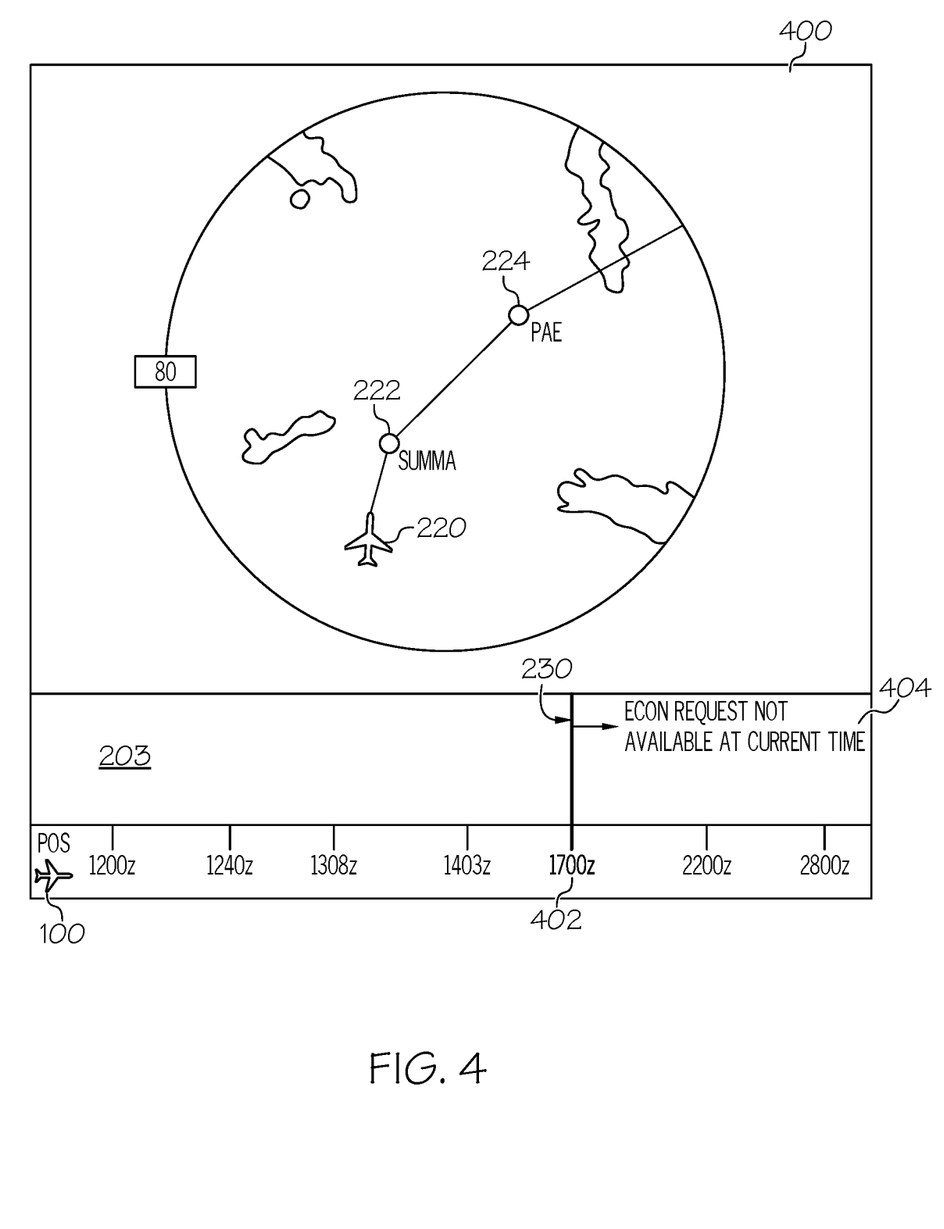

FIGS. 2-4 provide examples of the novel system 102 in operation. In FIGS. 2-4, examples of a top down view or lateral map constituting image 22 are shown. As used herein, the lateral map may be referred to as a lateral image. The lateral image in each of FIGS. 2-4 has a width 202. Along a peripheral edge of the lateral map, a time scale 203 is depicted, being substantially the same width as the lateral image 200. In each of the lateral images in FIGS. 2-4, a symbol 220, representing the aircraft 100, is rendered on the lateral image at its current location. In the examples, a waypoint 222 (SUMMA) and waypoint 224 (PAE) are shown on a flight path 226.

The time scale 203 is generated and displayed on the display system 112, which, in practice, may be part of a cockpit display system. The control module 104 generates the time scale 203 and commands the display system 112 to render or display the time scale as described herein. In various embodiments, the time scale is generated to be coextensive with the bottom peripheral edge of the lateral image 200, and not occluding the features displayed on the lateral image 200. Time scale 203 has a width 202 and a height 204. The time scale 203 has equidistant time demarcations from left to right in the region 206 and has thereon a symbolic indicator 230 of a user selected time. In the example, the symbolic indicator 230 is a vertical bar. In various embodiments, the units of the time scale 203 are in coordinated universal time (UTC). Aircraft 100 is depicted on the lateral map with symbol 220 and on the time scale 203 with symbol 208. The aircraft symbol 208 is located on the time scale 203 next to an alphanumeric indication of a present time 210 and units. In FIGS. 2-4, the present time 210 is 1200z.

As described herein, a recommended change to the active trajectory can come from one or more sources, and the sources may be on-board or external. When a recommended change to the active trajectory is received by the control module 104, it is time-tag processed to obtain an associated time for which it is relevant, and to formulate the recommended change as a clearance request at the associated time. The control module 104 compares associated times to a current time to temporally organize the clearance requests. Any clearance requests that have an associated time that is equal to the current time or later may be displayed, dependent upon a user selected time frame for display. Clearance requests that have an associated time that is later than the current time are referred to as future and/or predicted clearance requests.

The control module 104 references communication rules and formats the clearance requests as a downlink message (DM). The formatting and sequence of information in a CPDLC message is dictated by standards promulgated by the Federal Aviation Authority (FAA). The CPDLC rules assign a unique DM identification number in accordance with its intended use. In addition, the CPDLC rules detail the format for the message itself, based on the intended use of the message. Details for this may be found in Advisory Circular AC_90-117.pdf, but some examples are provided in Table 1 for reference. In Table 1, example 1, a "DM27" is a request for a weather deviation, and in example 2, a "DM9" is a request to climb to a different level (altitude). It may be appreciated that the CPDLC rules include many other requests. In some instances, a request is made for the purpose of improving flight economy or flight efficiency; for example, a request to climb to a different altitude or deviate in another way may be "due to Econ", which means it is a request that could save fuel or flight time.

TABLE 1

| Example | Message Element Identifier | Message Element Intended Use | Format for Message Element Display | Response | CPDLC message |
|---|---|---|---|---|---|
| 1 | LATD-2 | Request for a weather deviation up to the specified distance(s) off track in the specified direction(s). | REQUEST WEATHER DEVIATION UP TO (lateral deviation) OF ROUTE | Y | DM27 REQUEST WEATHER DEVIATION UP TO (specified distance) (direction) OF ROUTE |
| 2 | LVLD-2 | Request for a climb to the specified level or vertical range. | REQUEST CLIMB TO (level) | Y | DM9 REQUEST CLIMB TO (level) |

The user may select or request time frames for which to display clearance requests. When the user selects a future time, the control module 104 determines which of the clearance requests are relevant at the selected future time, which means that they have an associated time that is equal to or after the selected future time. Clearance requests that are relevant at the future time are defined as predicted clearance requests. The control module 104 generates display commands to cause the display system 112 to render, on the time scale 203, the formatted predicted clearance requests alongside the symbolic indicator 230. When the control module determines that a previously displayed formatted predicted clearance request is no longer relevant, be that to the selected future time, or responsive to receiving a second user selected future time, the control module 104 removes the rendering of the formatted predicted clearance request.

In FIG. 2, at a selected future time 212 (1240z), there are three predicted clearance requests that are relevant at the selected future time 212. In addition to displaying the formatted predicted clearance request, the control module displays an alphanumeric message about the reason or source for the recommendation. Accordingly, in FIG. 2: 214 is DM9, with an alphanumeric message "request climb to [FL 300]—due to econ;" 216 is DM11, with an alphanumeric message, "At [PAE] request climb to [F320]—due to econ;" and 218 is DM18, with an alphanumeric message, "Request [280KT]—due to RTA." While these DM messages are depicted as renderings on the display system 112, it is readily appreciated that the control module 104 could generate commands for an audio system and the messages could be annunciated via the audio system.

In FIG. 3, at a selected future time 302 (1403z), there are two predicted clearance requests: 304 is DM17 with an alphanumeric message "At [1300z] request offset [2L] of route—due to weather;" 306 is DM16, with an alphanumeric message, "At [PAE] request offset [3L] of route—due to weather." In FIG. 4, at a selected future time 402 (1700z), there is one predicted clearance request: 404, which has an alphanumeric message "Econ request not available at current time."

Comparing FIGS. 2-4, it is notable that aircraft 100 is at the same current location and on the same flight path in each scenario, but what has changed are the features displayed on the time scale 203. This is because, in each of FIGS. 2-4, a different future time is selected, and the features displayed are relevant at the user selected future time. Also notable is that when a predicted clearance request is (i) not relevant in the selected future time, it is not displayed, and (ii) no longer valid at the selected future time, it is removed from the time scale 203 if it was previously displayed. Also notable is that the various predicted clearance requests are from a variety of sources, as mentioned. In some cases (214, 216), they are fuel related ("due to econ") and therefore are likely from an on-board system. In other cases (304, 306), they are weather related, which are likely due to input from an external source 50.

Figure 5:
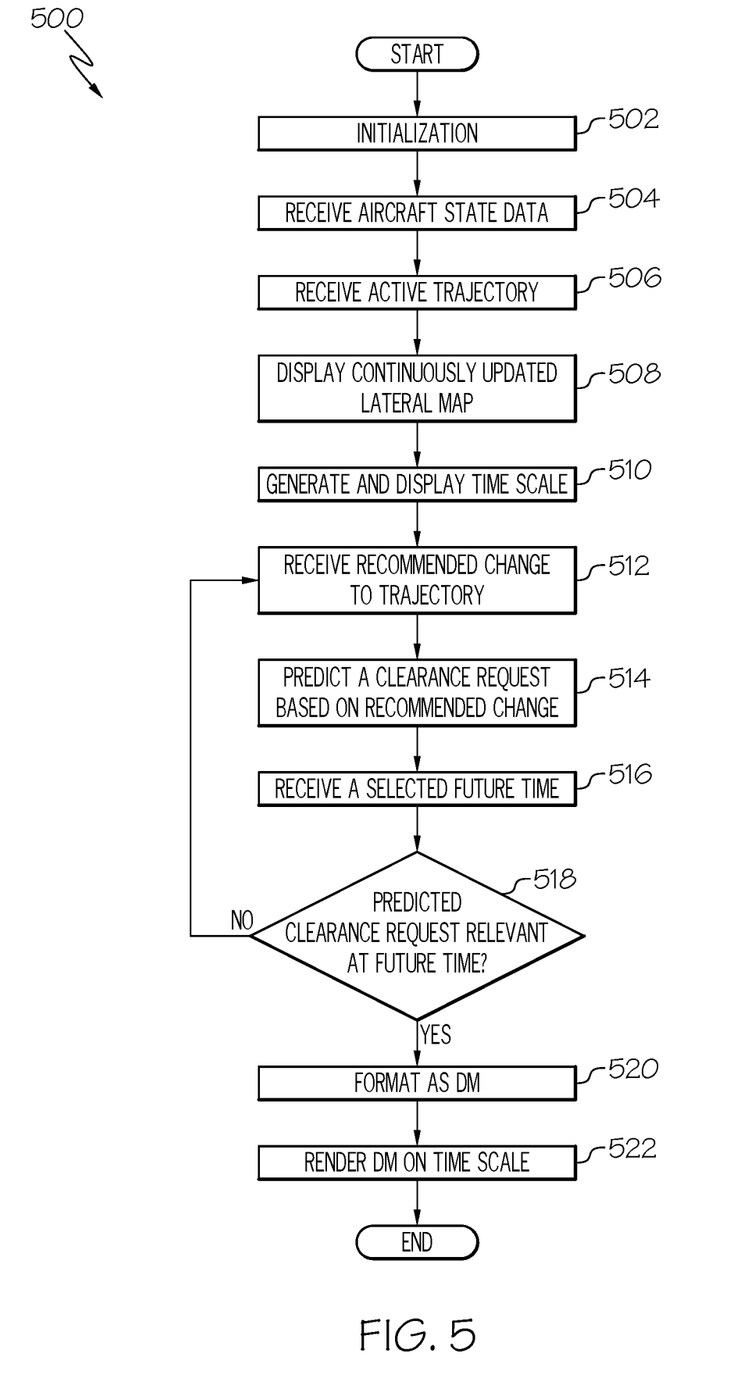
FIG. 5 is a method for time-based viewing of clearance requests, in accordance with an exemplary embodiment.

The system 102 may make its determinations and selections in accordance with a method such as method 500 of FIG. 5. With continued reference to FIGS. 1-4, a flow chart is provided for a method 500 for providing a system 102, in accordance with various exemplary embodiments. Method 500 represents various embodiments of a method for adaptive clearance request prediction. For illustrative purposes, the following description of method 500 may refer to elements mentioned above in connection with FIG. 1. In practice, portions of method 500 may be performed by different components of the described system. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 if the intended overall functionality remains intact.

The method starts, and at 502 the control module 104 is initialized and the system 102 is in operation. Initialization may comprise uploading or updating instructions and applications 160, program 162, lookup tables, and formatting instructions that may be stored in the database 156. Stored variables may include, for example, configurable, predetermined time margins, parameters for setting up a user interface, and the various shapes, various colors and/or visually distinguishing techniques used for the time scale 203, and related icons and alerts. In some embodiments, program 162 includes additional instructions and rules for rendering information differently based on type of display device in display system 112. Initialization at 502 may also include identifying external sources 50 and/or external signals and the communication protocols to use with each external source 50.

At 504, aircraft state data is received. At 506, an active trajectory is received. At 508, the display system 112 continuously updates a lateral image 22 based on received data. At 510, the time scale 203 is generated and displayed. It is generated to have the size, units of time, demarcations, symbolic indicator 230, and location on the display device 20, as described herein. At 512, a recommended change to the trajectory is received. At 514, the recommended change is time tag processed and a clearance request based on the recommended change is generated or predicted. As mentioned above, the clearance requests are temporally organized with respect to the current time. At 516, a user selected future time is received, and at 518, the method 500 determines whether the predicted clearance request is relevant at the selected future time. If the predicted clearance request is relevant at the future time, the predicted clearance request is formatted as a downlink message (DM) at 520 and rendered on the time scale 203 at 522. If the predicted clearance request is relevant at the future time, the method may continue to cycle to 512, wherein another recommended change to the trajectory is received, or to 516, when a different future time is selected. After 522, the method may continue cycling or end.

Thus, technologically improved systems and methods that provide time-based viewing of predicted clearance requests are provided. As mentioned, the technical effects of this novel system include reduced head-down time, increased pilot control of the occurrence of head-down time, and an ability for a flight crew to proactively negotiate with ATC for a clearance request, improved situation awareness, and an overall improved pilot-machine interface. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for time-based viewing of clearance requests, comprising:
    a source of aircraft state data;
    a source of an active trajectory;
    a display system configured to process the aircraft state data and active trajectory data to display a continuously updated lateral image depicting the aircraft at a current location on the active trajectory;
    a source of a recommended change, defined as a recommended change to the active trajectory; and
    a control module operationally coupled to the source of aircraft state data, the source of the active trajectory, the display system, and the source of the recommended change, the control module configured to:
        generate a time scale of substantially a same width as the lateral image, having therein equidistant time demarcations from left to right;
        command the display system to display the time scale at a periphery of the image;
        time-tag process the recommended change to predict a clearance request;
        receive a user selected future time;
        determine that the predicted clearance request is relevant at the future time;
        format the predicted clearance request as a downlink message (DM); and
        render, on the time scale, the formatted predicted clearance request at the future time.

2. The system of claim 1, wherein the control module is further configured to:
    temporally organize the recommended request by comparing an associated time with a current time; and
    remove the rendering of the formatted predicted clearance request when it is no longer relevant at the future time.

3. The system of claim 2, wherein the source of the recommended change comprises a weather data source.

4. The system of claim 3, wherein the source of the recommended change further comprises an onboard avionics system.

5. The system of claim 4, wherein the source of the recommended change further comprises one or more of: an air traffic control (ATC) system, an Airline Operational Center (AOC), and a ground system.

6. The system of claim 5, wherein the control module comprises a storage device of controller pilot data link communication (CPDLC) format rules, and wherein the controller references the CPDLC format rules to format the predicted clearance request.

7. The system of claim 6, wherein the recommended change is one of a plurality of recommended changes, and wherein the control module is further configured to:
for each of the plurality of recommended changes,
time-tag process the recommended change to obtain an associated time for which it is relevant and to formulate the recommendation as a clearance request at an associated time; and
when the associated time is relevant at the future time, format the predicted clearance request as a downlink message (DM); and
render, on the time scale, the formatted predicted clearance request at the future time.

8. The system of claim 7, wherein the control module is further configured to:
for each formatted predicted clearance request,
remove the rendering of the formatted predicted clearance request when it is no longer relevant to the future time.

9. A method for clearance request prediction, comprising:
at a display system, receiving and processing aircraft state data and active trajectory data to display a continuously updated lateral image depicting the aircraft at a current location on the active trajectory;
at a control module operationally coupled to the display system,
generating a time scale of substantially a same width as the lateral image, having therein equidistant time demarcations from left to right;
commanding the display system to render the time scale;
receiving a recommended change to the trajectory;
time-tag processing the recommended change to predict a clearance request and associated time;
receiving a user selected future time;
determining that the predicted clearance request is relevant at the future time;
formatting the predicted clearance request as a downlink message (DM); and
rendering, on the time scale, the formatted predicted clearance request at the future time.

10. The method of claim 9, further comprising:
temporally organizing the recommended request by comparing an associated time with a current time; and
removing the rendering of the formatted predicted clearance request when the relevant time is not later than or equal to the future time.

11. The method of claim 10, wherein the recommended change is one of a plurality of recommended changes, and further comprising:
for each of the plurality of recommended changes,
time-tag process the recommended change to obtain an associated time for which it is relevant and to formulate the recommended change as a clearance request at an associated time; and
when the associated time is relevant at the future time, format the predicted clearance request as a downlink message (DM); and
render, on the time scale, the formatted predicted clearance request at the future time.

12. The method of claim 11, further comprising, for each formatted predicted clearance request, removing the rendering of the formatted predicted clearance request when the associated time is not relevant to the future time.

13. The method of claim 12, further comprising receiving the recommended change from an onboard avionics system.

14. The method of claim 12, further comprising receiving the recommended change from one or more of: an air traffic control (ATC) system, an Airline Operational Center (AOC), and a ground system.

15. The method of claim 14, further comprising referencing a storage device of controller pilot data link communication (CPDLC) format rules to format the predicted clearance request.

16. A system for time-based viewing of clearance requests, comprising:
a source of aircraft state data;
a source of an active trajectory;
a display system configured to process the aircraft state data and active trajectory data to display a continuously updated lateral image depicting the aircraft at a current location on the active trajectory;
a source of a recommended change, defined as a recommended change to the active trajectory; and
a control module operationally coupled to the source of aircraft state data, the source of the active trajectory, the display system, and the source of the recommended change, the control module configured to:
generate a time scale of substantially a same width as the lateral image, having therein equidistant time demarcations from left to right;
command the display system to display the time scale at a periphery of the image;
time-tag process the recommended change to predict a clearance request;
receive a user selected future time;
display a symbolic indicator at the future time on the time scale;
determine whether the predicted clearance request is relevant at the future time;
format the predicted clearance request as a downlink message (DM); and
render, on the time scale, the formatted predicted clearance request alongside the symbolic indicator at the future time while the predicted clearance request is relevant at the future time.

17. The system of claim 16, wherein the user selected future time is a first future time, and
wherein the control module is further configured to:
receive a second future time; and
remove the rendering of the formatted predicted clearance request when it is not relevant at the second future time.

18. The system of claim 17, wherein the source of the recommended change comprises an external source.

19. The system of claim 18, wherein the external source of the recommended change further comprises one or more of: an air traffic control (ATC) system, an Airline Operational Center (AOC), a weather data source, and a ground system.

20. The system of claim 19, wherein the source of the recommended change further comprises an onboard avionics system.

* * * * *